United States Patent [19]

Spry

[11] Patent Number: 5,142,418
[45] Date of Patent: Aug. 25, 1992

[54] SUPERCONDUCTING TUNABLE INORGANIC FILTER

[75] Inventor: Robert J. Spry, Tipp City, Ohio

[73] Assignee: The Unites States of America as represented by the Secretary of the Air Force, Washington, D.C.

[21] Appl. No.: 386,797

[22] Filed: Jul. 20, 1989

[51] Int. Cl.$^5$ .......................... G02R 5/24; H01C 7/16
[52] U.S. Cl. ................................... 359/885; 356/234
[58] Field of Search ................ 356/234, 414; 350/311, 350/312, 317; 505/828, 848; 359/885

[56] References Cited

U.S. PATENT DOCUMENTS

| | | |
|---|---|---|
| H39 | 3/1986 | Gubser et al. |
| 3,623,795 | 11/1971 | Taylor et al. |
| 3,773,684 | 11/1973 | Marks |
| 3,790,250 | 2/1974 | Mitchell et al. |
| 3,818,390 | 6/1974 | Gikow et al. |
| 3,857,114 | 12/1974 | Minet et al. |
| 3,956,727 | 5/1976 | Wolf |
| 4,093,353 | 6/1978 | Lang |
| 4,099,854 | 7/1978 | Decker et al. |
| 4,114,985 | 9/1978 | Friedman |
| 4,180,605 | 12/1979 | Gilbert et al. |
| 4,261,331 | 4/1981 | Stephens |
| 4,307,942 | 12/1981 | Chahroudi |
| 4,499,441 | 2/1985 | Lynch et al. |
| 4,521,682 | 6/1985 | Murakami et al. |
| 4,657,345 | 4/1987 | Gordon |
| 4,713,795 | 12/1987 | Woike et al. |
| 4,719,342 | 1/1988 | Cohn et al. |
| 4,737,000 | 4/1988 | Garlick et al. |
| 4,754,384 | 6/1988 | Levy et al. |

*Primary Examiner*—Nelson Moskowitz
*Attorney, Agent, or Firm*—Bobby D. Scearce; Donald J. Singer

[57] ABSTRACT

An optical filter structure for blocking radiation at or shorter than a preselected design wavelength is described which comprises a substantially transparent dielectric host material having dispersed therethrough a multiplicity of grains in preselected size and volume density within the dielectric, the grains comprising a material characterized by a transition between insulating and superconducting states at a characteristic transition temperature. The grains have diametric size substantially smaller then the longest wavelength of light to be absorbed, the filter absorbing resonantly via the dielectric anomaly and being tunable through selection of volume fraction of the grains within the dielectric.

13 Claims, 1 Drawing Sheet

SUPERCONDUCTING TUNABLE INORGANIC FILTER

RIGHTS OF THE GOVERNMENT

The invention described herein may be manufactured and used by or for the Government of the United States for all governmental PurPoses without the Payment of any royalty.

CROSS-REFERENCE TO RELATED APPLICATIONS

The invention described herein is related to copending application Ser. No. 06/874,202 filed Jun. 6, 1986, entitled "Tunable Inorganic Filter", having the same assignee as that of the present application.

BACKGROUND OF THE INVENTION

The present invention relates generally to laser hardened materials and structures, and more particularly to a novel optical filter structure for selectively blocking laser radiation within a predetermined wavelength band while passing radiation of other wavelengths.

Optical switching devices comprising transition or switching materials which are optically transparent in one state but which transform to an opaque metallic state when heated to a characteristic transition temperature are well developed for applications such as optical filters, modulators, laser output couplers and the like. These devices are generally characterized by a transition from substantial transparency below the characteristic transition temperature to substantial opacity above that temperature, at all wavelengths.

The invention provides a substantially improved optical absorption band filter capable of actively or passively blocking light of wavelength equal to or shorter than a predetermined design wavelength while passing wavelengths longer than the design wavelength. The invention is an optical high-pass filter which becomes absorptive upon being cooled to an insulating-to-superconducting transition temperature $T_c$, or is driven to the transmissive state by heating. The filter comprises insulating-to-superconducting transition material in granular form dispersed in a dielectric host material of substantially any shape. In the low temperature state, the resonant absorption is provided by the dielectric anomaly described by the Maxwell-Garnett theory. The invention therefore is a substantial improvement over the totally opaque switching reflection filter, the non-switching metallic array filter, the fixed wavelength switching element reflection band filter, and other wavelength responsive laser hardening devices.

It is, therefore, a principal object of the invention to provide an improved optical filter.

It is a further object of the invention to provide an optical filter for blocking laser radiation at and shorter than a preselected wavelength while passing radiation at longer wavelengths.

It is yet another object of the invention to provide an optical filter having fast response time.

It is another object of the invention to provide an optical filter having a curved structure or other shaped configuration It is another object of the invention to provide an optical filter for actively or passively absorbing a preselected wavelength range.

It is a further object of the invention to provide a switchable filter incorporating insulating-to-superconducting materials to provide selective wavelength filtering.

It is a further object of the invention to provide an optical filter which is switchable at preselected temperature, has low absorption losses prior to switching, and is independent of impinging radiation prior to switching.

These and other objects of the invention will become apparent as the description of representative embodiments proceeds

SUMMARY OF THE INVENTION

In accordance with the foregoing principles and objects ot the invention, an optical filter for blocking radiation at or shorter than a preselected design wavelength is described which comprises a substantially transparent dielectric host material having dispersed therethrough a multiplicity of grains of preselected diametric size substantially smaller than the longest wavelength of light to be absorbed and of preselected volume density within the dielectic, the grains comprising a material characterized by a transition between insulating and superconducting states upon being heated or cooled to a characteristic transition temperature.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
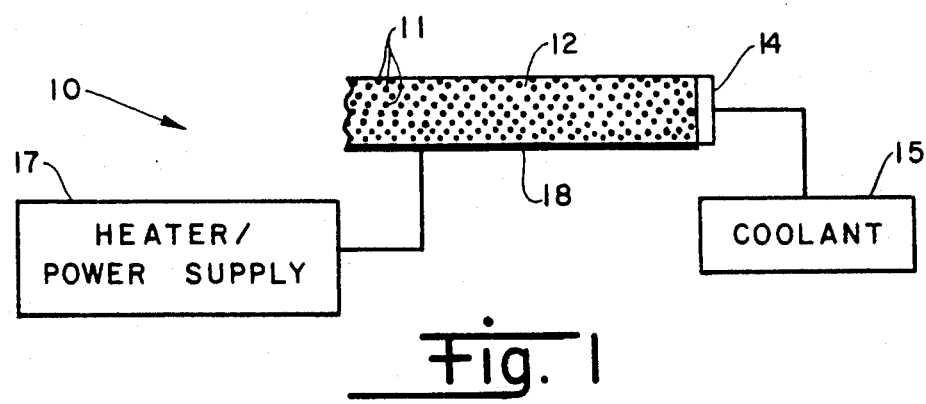
FIG. 1 is a fragmentary sectional view of an optical filter structure of the invention including schematic representations of heating and cooling means for active operation of the invention.

Referring now to FIG. 1, shown therein is a fragmentary sectional view of a filter 10 structure of the invention. Filter 10 is an optical high pass filter which comprises a multiplicity of small grains 11 of material which is normally transparent to substantially all wavelengths but which becomes absorptive upon being cooled to an insulating-to-superconducting transition temperature $T_c$, or which is driven to the transmissive state by heating. Grains 11 are randomly and uniformly dispersed in a film or slab 12 of a transparent dielectric carrier or host material. The grains are preferably substantially uniform in diemetric size (about 3 to 20 nm) and smaller in diameter than the wavelength (about 300 to 2500 nm) of radiation sought to be blocked, but large enough to be described by the ordinary macroscopic Maxwell equations. The volume density of grains 11 within slab 12 is selected as discussed below in order to impart the desired absorption characteristics to filter 10, and may preferably range from about 0.01 to about $-0.4$ volume percent, depending on the wavelength of light to be absorbed; that is, the filter is tunable by preselecting the volume density of the grains. Suitable material for grains 11 may include, but are not necessarily limited to, ceramics such as the Ba—La—Cu—O system including $Ba_xLa_{5-x}Cu_5O_{5(3-y)}$ $Ba_xLa_{1-x}CuO_{3-y}$, and $Ba_xLa_2$-

$xCuO_{4-y}$; the Sr—La—Cu—O system including $Sr_xLa_{2-x}CuO_{4-y}$ and $(Sr_xLa_{1-x})_2CuO_{4-x}$; the Y—Ba—Cu—O system including $YBa_2Cu_3O_{9-y}$ and $Y_{0.87}Ba_{1.53}Cu_3O_y$; the Ba—Sr—La—Cuo—O system including $(Ba,Sr)_x\text{-}La_{2-x}CuO_{4-y}$; the La—Cu—O system including $La_2CuO_4$; and the Ba—Pb—Bi—O system including $BaPb_{1-x}Bi_xO_3$, and organic semiconductors such as copper-doped, silver-doped or golddoped tetracyanoquinodimethane (TCNQ). Insulating-to-superconducting transition temperatures Tc are in the range of about 0.3° to 120° K. Grains 11 may be produced using substantially standard techniques including fractionation of single crystals, co-sputtering, or matrix isolation techniques, as would occur to one with skill in the applicable field.

Figure 2:
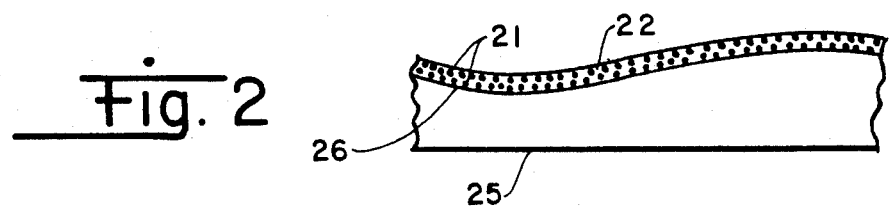
FIG. 2 is a fragmentary sectional view of a filter of the invention in the form of a coating on an optical component.

Slab 12 may comprise any transparent dielectric material generally categorized as transparent insulators or semiconductors, and may typically include semiconductors, glasses, plastics, epoxies, amorphous materials, polymers and other organics. Grains 11 may typically be dispersed within the host dielectric material by fusing the host material and blending in grains 11, by mixing grains 11 into constituent materials in the formulation in the host material, or other technique known to the skilled artisan. The host material with grains 11 blended therein may then be set in a sheet or film, or in a contoured shape, and may have a smooth grated or other surface for certain advantages occurring to the skilled artisan. Alternatively, the host material may be in the form of a viscous fluid, such as a spreadable epoxy or plastic, with the grains dispersed therein, the mixture of which may be painted onto a surface to be protected. Accordingly, and with reference now to FIG. 2, the filter of the invention may be applied to an optical element 25 of curved or other irregular contour 26 in the form of a film 25 having grains 21 dispersed therein.

In the operation of filter 10 of the invention, filter 10 is selectively cooled using cooling means 15 to the transition temperature $T_c$ of grains 11 in order to selectively block radiation at or below a characteristic transition temperature as described below. Alternatively, for a filter 10 maintained below the characteristic transition temperature, filter 10 may be heated to transition to the transmissive state for normal operation utilizing heater 17. The granular structure of the filter is characterized by rapid response to transition (switching).

In the unswitched state, filter 10 is substantially transparent to all wavelengths of impinging radiation. The only absorption losses result from mismatch between the refractive index of the switching material grains and that of the dielectric host. With judicious selection of host material and grain material combination, mismatch of refractive indices may be reduced substantially.

After switching to the superconducting state, the dielectric response of the composite material is governed by:

$$\frac{\epsilon_{GM}(\omega) - \epsilon_D(\omega)}{L_m\epsilon_{GM}(\omega) + (1 - L_m)\epsilon_D(\omega)} = x \frac{\epsilon_m(\omega) - \epsilon_D(\omega)}{L_m\epsilon_m(\omega) + (1 - L_m)\epsilon_D(\omega)} \quad (1)$$

derived from Maxwell-Garnet theory, where $\Omega$ is the angular frequency of the impinging radiation, $\epsilon_{GM}(\Omega)$ is the dielectric constant of the composite material in the switched state, $\epsilon_D(\Omega)$ is the dielectric constant of the host medium, $\epsilon_m(\Omega)$ is the dielectric constant of the grains in the switched state, x is the volume fraction of the grains in the composite, and $L_m$ is the depolarization factor for the grains which are assumed to be ellipsoidal in shape ($L_m = \frac{1}{3}$ for spherical grains).

Absorption by the filter of the invention is provided by the phenomenon known as the dielectric anomaly in $\epsilon_{GM}$, occuring at a characteristic frequency $\Omega_A$ corresponding to a preselected design wavelength $\lambda_A$. In existing filter structures absorption of radiation of preselected wavelength is effected by including in the structure scattering materials having size of the order of the wavelength to be blocked, which materials exhibit Rayleigh scattering with characteristic cross section inversely proportional to the fourth power of the wavelength. In contrast, the filter of the invention comprises grains having diametric size substantially smaller than the longest wavelength to be absorbed which results in a resonance at the characteristic wavelength depending on volume fraction and particle size. The anomaly in $\epsilon_{GM}$ is obtained mathematically from Eq(1) by neglecting the imaginary part of $\epsilon_m(\Omega)$, and by assuming $\epsilon_{GM}(\Omega)$ to be infinitely large. The resulting condition for the anomaly at $\Omega_A$ is then, $$\epsilon_m = -\epsilon_D \left[ \frac{1}{L_m(1-x)} - 1 \right] \quad (2)$$

The value for $\Omega_A$ may therefore be readily selected by suitable choice of size and concentration of the material grains (x).

If light of intensity $I_o$ impinges on the surface (z=0) of a material, the intensity I at an arbitrary depth z into the material is governed by Beer's law:

$$I = I_o e^{-Kz} \quad (3)$$

where K is the absorption coefficient of the material. The refractive index N of the material may be written as, $$N = n - ik \quad (4)$$

where n is the real part and k is the imaginary part of N, and the dielectric constant $\epsilon$ may be written as, $$\epsilon = \epsilon_1 - i\epsilon_2 \quad (5)$$

where $\epsilon_1$ is the real part and $\epsilon_2$ is the imaginary part of $\epsilon$. From the definition $\epsilon \equiv N^2$, it follows that, $$\epsilon_1 = n^2 - k^2 \text{ and } \epsilon_2 = 2nk. \quad (6)$$

From Maxwell's equations it can be shown that the electric field in the material decays as $\exp(-2\Omega kz/c)$, where c is the speed of light in vacuum and $\Omega$ is related to the frequency f as $\Omega = 2\pi f$. From Eqs (6), the absorption coefficient as a function of dielectric constant of the composite is given by, $$K = 2\Omega k/c = 2\pi\epsilon_2/n\lambda \quad (7)$$

Consider as an example that a filter is required to pass radiation of wavelength longer than 620 nm, and absorb shorter wavelengths, when the filter is in the switched superconducting state. The composite dielectric function $\Omega_{GM}$ may be expressed as:

$$\Omega_{GM} = 68_1 - i\epsilon_2 \quad (8)$$

Figure 3:
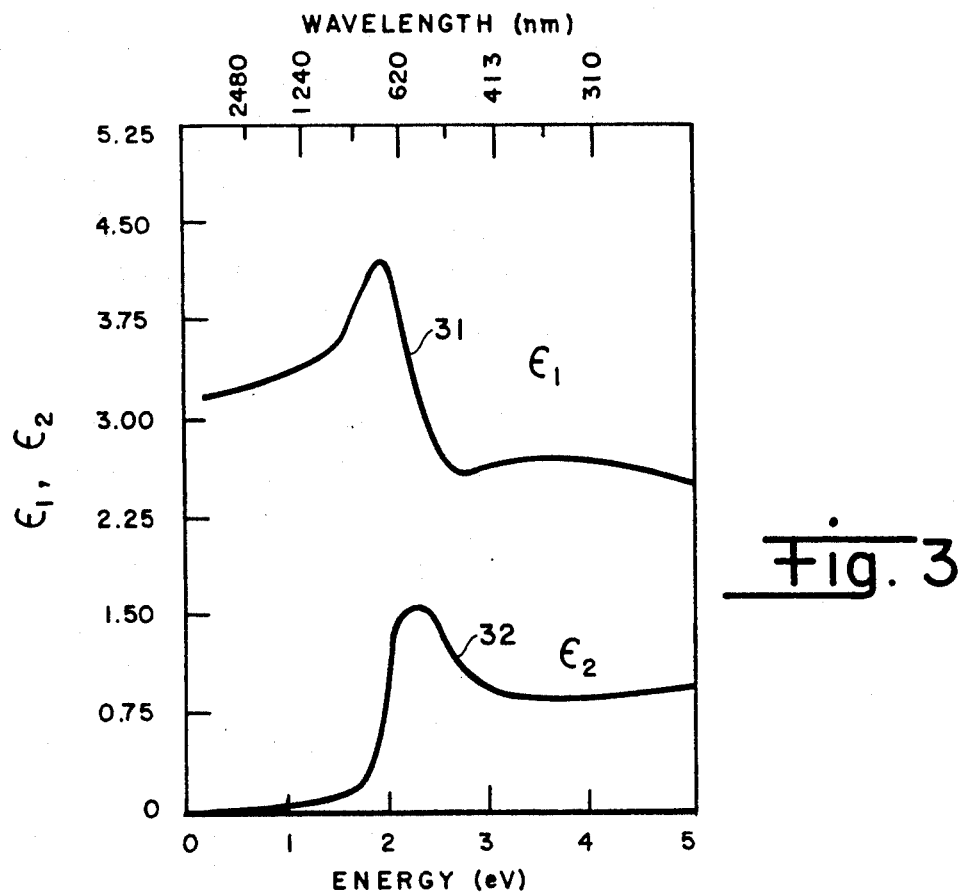
FIG. 3 is a response function plot of dielectric constant versus energy for a filter structure of the invention.

If a value for x is selected as 0.15 and spherical grains of switching material of about 60 angstroms diameter are used, Eq (1) yields a response function depicted in FIG. 3. Eq (7) shows $\epsilon_2$ to be directly proportional to the absorption coefficient K. Resonance at about 600 nm is shown by peaks 31,32 for $\epsilon_1$, $\epsilon_2$ respectively. To a good degree of accuracy, radiation of wavelength below about 620 nm is blocked while radiation of longer wavelengths pass through the filter. In the unswitched state the absorption of the filter is essentially zero.

In an alternative embodiment, the filter of the invention may be structured to selectively switch by controllably heating the dielectric slab sufficiently to cause the transition material grains to transition. Accordingly, a controllable heater 17 may be operatively connected to the dielectric slab as suggested in FIG. 1. In nonlimiting examples of the foregoing, the dielectric slab may itself be used as a heater with appropriate electric leads attached thereto; in this example it is desirable for the dielectric to be a semiconductor. Alternatively, a transparent and electrically conducting layer 18 of tin oxide or equivalent material may be disposed on the dielectric 12, with appropriate electrical leads attached near the edge of the dielectric and to a power supply. In further alternative, layer 18 may comprise a grid of resistive metal wire (e.g., nichrome), the grid dimensions being selected to avoid diffraction effects in the filter. Further the transition material may be switchable through the application of an electric field. For active magnetic switching of filter 10, magnetic fields may be applied using nearby coils, as would occur to the skilled artisan guided by these teachings. In all cases, temperature sensors (not shown) may be attached to the dielectric to provide feedback for temperature control.

The invention therefore provides an optical band filter for actively or passively absorbing radiation at or shorter than a preselected wavelength while passing longer wavelengths. An optical system protected by the invention may therefore continue to receive a substantial portion of a signal greater than the preselected wavelength while blocking potentially damaging invasive radiation of shorter wavelengths. The response of the filter is wavelength independent with low absorption losses prior to switching. The filter is characterized by small thermal mass and thermal isolation of the switching material grains, and therefore may switch substantially faster than previously existing devices. The filter may be switched passively by absorption of radiation or actively by thermal or by heating using an electric field or magnetic field. The filter may be configured in substantially any size and shape, and is effective in its function at substantially all angles of incidence of impinging radiation. The invention may therefore find substantial use as a protective optical filter against laser weapons.

It is understood that modifications to the invention may be made, as might occur to one with skill in the field of the invention, within the scope of the appended claims. Therefore, all embodiments contemplated hereunder which acheive the objects of the invention have not been shown in complete detail. Other embodiments may be developed without departing from the spirit of the invention or from the scope of the appended claims.

I claim:

1. An optical filter structure for selectively blocking radiation of wavelengths shorter than a preselected wavelength, comprising:
   (a) a layer of substantially transparent dielectric material; and
   (b) a multiplicity of grains of transition material dispersed within said layer of dielectric material, said grains having predetermined size and volume density within said layer of dielectric material, and wherein said grains comprise a material having an electrical insulating phase above a characteristic temperature and a superconducting phase below said characteristic temperature, said grains having a diametric size smaller than said preselected wavelength.

2. The filter structure of claim 1 wherein said grains have a diametric size of from about 3 to about 20 nanometers.

3. The filter structure of claim 2 wherein said grains are dispersed within said layer of dielectric material to a volume density of from about 0.01 to about 0.4 volume percent.

4. The filter structure of claim 1 wherein said dielectric material is selected from the group consisting of semiconductor material, glass, plastic, epoxy and polymeric material.

5. The filter structure of claim 1 wherein said grains comprise a ceramic.

6. The filter structure of claim 5 wherein said ceramic is a barium-lanthanum-copper oxide.

7. The filter structure of claim 5 wherein said ceramic is a strontium-lanthanum-copper oxide.

8. The filter structure of claim 5 wherein said ceramic is a yttrium-barium-copper oxide.

9. The filter structure of claim 5 wherein said ceramic is a barium-strontium-lanthanum-copper oxide.

10. The filter structure of claim 5 wherein said ceramic is a lanthanum-copper oxide.

11. The filter structure of claim 5 wherein said ceramic is a barium-lead-bismuth oxide.

12. The filter structure of claim 1 wherein said grains comprise tetracyanoquinodimethane doped with a metal selected from the group consisting of copper, silver and gold.

13. The filter structure as recited in claim 1 further comprising means for controllably heating said grains.

* * * * *

UNITED STATES PATENT AND TRADEMARK OFFICE
CERTIFICATE OF CORRECTION

PATENT NO. : 5,142,418

DATED : August 25, 1992

INVENTOR(S) : Robert J. Spry

It is certified that error appears in the above-identified patent and that said Letters Patent is hereby corrected as shown below:

Column 1, line 8, "PurPoses" should be --purposes--.
Column 1, line 8, "Payment" should not be capitalized.
Column 1, line 22, "radiat:on" should be --radiation--.
Column 1, line 63, a period should follow "configuration".
Column 2, line 10, a period should follow "proceeds".
Column 2, line 14, "ot" should be --of--.
Column 2, line 62, "-0.4" should be --0.4--.
Column 3, line 4, "Cuo" should be --Cu--.
Column 3, line 10, "Tc" should be --$T_c$--.
Column 3, line 19, the period should be a comma.
Column 3, line 27, a comma should follow "smooth".

Column 3, line 62, "Ω" should be --ω--.
Column 3, line 63, "Ω" should be --ω--.
Column 3, line 65, "Ω" should be --ω--.
Column 3, line 66, "Ω" should be --ω--.
Column 4, line 5, the period should be a comma.
Column 4, line 5, "Ω" should be --ω--.
Column 4, line 19, "Ω" should be --ω--.
Column 4, line 20, "Ω" should be --ω--.
Column 4, line 21, "Ω" should be --ω--.
Column 4, line 27, "Ω" should be --ω--.
Column 4, line 31, the period should be a comma.

UNITED STATES PATENT AND TRADEMARK OFFICE
CERTIFICATE OF CORRECTION

PATENT NO.   : 5,142,418
DATED        : August 25, 1992
INVENTOR(S)  : Robert J. Spry It is certified that error appears in the above-identified patent and that said Letters Patent is hereby corrected as shown below:

Column 4, line 53, "$\Omega$" should be --$\omega$--.
Column 4, line 55, "$\Omega$" should be --$\omega$--.
Column 4, line 59 (Eq 7), "$\Omega$" should be --$\omega$--.

Signed and Sealed this

Eleventh Day of January, 1994

Attest:

BRUCE LEHMAN

*Attesting Officer*     *Commissioner of Patents and Trademarks*